United States Patent [19]

Murrel et al.

[11] Patent Number: 4,891,127

[45] Date of Patent: Jan. 2, 1990

[54] PREPARATION AND USE OF CATALYSTS COMPRISING A MIXTURE OF TUNGSTEN OXIDE AND SILICA SUPPORTED ON A BOEHMITE-LIKE SURFACE

[75] Inventors: Lawrence L. Murrel, South Plainfield; Nicholas C. Dispenziere, Jr., Wall, both of N.J.

[73] Assignee: Exxon Research and Engineering Company, Florham Park, N.J.

[21] Appl. No.: 310,984

[22] Filed: Feb. 15, 1989

Related U.S. Application Data

[62] Division of Ser. No. 815,202, Dec. 31, 1985, Pat. No. 4,831,007.

[51] Int. Cl.⁴ ...................... C10G 47/04; C10G 11/04
[52] U.S. Cl. .................................. 208/111; 208/112; 208/120; 208/123
[58] Field of Search ................ 208/120, 111, 123, 112

[56] References Cited

U.S. PATENT DOCUMENTS

| | | | |
|---|---|---|---|
| 3,242,069 | 3/1966 | Gladrow et al. | 208/120 |
| 3,274,120 | 9/1966 | Aftandillan | 502/263 |
| 3,502,595 | 3/1970 | Johnson et al. | 502/263 |
| 3,530,065 | 9/1970 | Leaman et al. | 208/120 |
| 4,335,022 | 6/1982 | Slaugh | 502/263 |
| 4,440,872 | 4/1984 | Grenoble et al. | 502/242 |
| 4,661,239 | 4/1987 | Steigleder | 208/111 |
| 4,708,945 | 11/1987 | Murrell et al. | 502/355 |
| 4,831,007 | 5/1989 | Murrell et al. | 502/355 |

*Primary Examiner*—Anthony McFarlane
*Attorney, Agent, or Firm*—Joseph J. Dvorak

[57] ABSTRACT

Useful cracking catalysts and catalyst supports comprising a mixture of tungsten oxide and silica supported on a boehmite-like surface which, in turn, is supported on alumina are prepared by forming a composite of particles of (a) tungsten oxide, (b) silica and (c) boehmite and subjecting the composite to steaming at a temperature of at least about 500° C. During the steaming, the tungsten oxide and silica react with the surface of the boehmite as the boehmite converts to alumina.

12 Claims, No Drawings

PREPARATION AND USE OF CATALYSTS COMPRISING A MIXTURE OF TUNGSTEN OXIDE AND SILICA SUPPORTED ON A BOEHMITE-LIKE SURFACE

This is a division of application Ser. No. 815,202, filed 12/31/85, now U.S. Pat. No. 4,831,007.

BACKGROUND OF THE INVENTION

FIELD OF THE INVENTION

This invention relates to the preparation and use of catalysts comprising a mixture of tungsten oxide and silica supported on a boehmite-like surface. More particularly, this invention relates to the preparation of catalyst supports and cracking catalysts comprising mixtures of tungsten oxide and silica supported on a boehmite-like surface which are prepared by forming a composite of a mixture of (a) tungsten oxide or tungsten oxide precursor, (b) particles of silica and (c) particles of boehmite and subjecting said composite to high temperature steaming at a temperature of at least about 500° C. for a time sufficient for at least a portion of said silica and tungsten oxide mixture to react with the surface of the boehmite as the bulk boehmite converts to alumina.

BACKGROUND OF THE DISCLOSURE

The use of silica-alumina composites as catalysts and as catalyst support materials is well known to those skilled in the art. These catalysts are prepared in many different ways such as co-precipitation, various co-gel techniques, by contacting alumina with various silica precursor salts such as organosilanes, including alkoxy silanes followed by calcination of the so-formed composite to produce the desired silica-alumina material. Use of the latter techniques enables one to obtain an alumina whose surface is partly or completely covered with silica as opposed to a homogeneous or heterogeneous silica-alumina composite.

U.S. Pat. No. 4,440,872 to Grenoble et al discloses various acid cracking catalysts. Some of the catalyst supports are prepared by impregnating gamma alumina with a silane compound followed by either calcining or steaming the impregnate at 500° C. The calcined support material is then impregnated with ammonium meta-tungstate which is steamed at high temperature to form a catalyst. Peters et al in U.S. Pat. No. 3,671,432 disclose a process for preparing a supported transition metal of Group V or VI of the Periodic Table which includes mixing a water dispersible transition metal compound with particles of support material and calcining the mixture at a temperature of from 200°–1000° C. However, the disclosure contains examples employing only either chromium trioxide or vanadium pentoxide as the water dispersible transition metal compounds. U.S. Pat. No. 3,668,151 mixes particulate zinc oxide with particulate gamma alumina and calcines the mixture at 600°–1500° C. Browning et al in U.S. Pat. No. 3,182,012 prepare a cracking catalyst comprising cobalt and molybdenum on a silica-alumina support. The silica and alumina may be mixed as dry powders, but the cobalt and molybdenum are deposited on the support by impregnation. The final impregnate is calcined at 600°–1200° F.

In U.S. Pat. No. 2,830,960 Broomhead mixes cobalt formate, molybdic and an alumina hydrogel, followed by drying and calcining the mixture at 450°–650° C. Porter et al in U.S. Pat. No. 2,640,802 disclose mixing powdered cobalt oxide, molybdic oxide and alumina, pelleting the mixture and heating the pellets for two hours at 530° C. U.S. Pat. No. 3,151,901 discloses preparing alumina based catalyst by dry mixing alumina with an oxide of a metal selected from the group consisting of the iron transition metals, molybdenum, tungsten, vanadium and mixtures thereof and calcining the resulting mixture at 800°–1200° F.

U.S. Pat. No. 2,394,796 discloses impregnating a porous, hydrated alumina, including boehmite, with silicon tetrachloride or tetraethylsilicate, followed by hydrolysis of the impregnate to form silica. In U.S. Pat. No. 2,493,896 an alumina support material is impregnated with ethylsilicate or a polymer of ethylsilicate, followed by calcination. Multiple impregnations, with calcining after each impregnation, are said to yield a catalyst containing up to 50 wt. % silica. In U.S. Pat. No. 4,172,809 a process for preparing alumina extrudates is disclosed wherein a silicon compound is added to an alumina gel during extrusion of the gel. The resulting extrudate is then calcined. U.S. Pat. No. 2,579,123 discloses reactivating deactivated silica-alumina catalysts by impregnating with a silicon or silicate compound, followed by calcination.

U.S. Pat. No. 3,502,595 discloses the preparation of silica-alumina catalysts by impregnating a hydrated alumina, including boehmite, with one or more organic esters of silicon followed by calcination. U.S. Pat. No. 4,038,337 discloses the preparation of a silica-alumina catalyst by reacting gamma or eta alumina with various esters of orthosilicic acid followed by calcination. U.S. Pat. No. 4,080,284 discloses contacting a support material, such as alumina, with an organic or halogen-substituted silane. The silylated support material is then calcined, followed by steaming at 900°–1600° F.

U.S. Pat. No. 4,013,589 discloses a process for improving the mechanical and thermal properties (stability) of gamma alumina by impregnating the alumina with a hydrolyzable silicone compound and hydrolyzing the impregnate to convert the silicon compound to silica. Temperatures of up to 500° C. are employed for the hydrolyzing step. In one example, a negative comparative example, the alumina was impregnated with a "Ludox" slurry (a solution of colloidal silica) followed by calcination in air at 500° C.

SUMMARY OF THE INVENTION

It has now been discovered that useful cracking catalysts and catalyst supports comprising mixtures of silica and tungsten oxide supported on a boehmite-like surface can be prepared by compositing particles of boehmite with particles of silica and tungsten oxide and steaming the composite at a temperature of at least about 500° C. for a time sufficient for at least a portion of the silica and tungsten oxide to react with the surface of the boehmite. In a preferred embodiment of the process of this invention the steaming temperature will be at least about 700° C. and the silica and tungsten oxide will also spread out, wet and disperse over at least a portion of the surface.

In a preferred embodiment, the boehmite will be porous possessing both external and internal surfaces so that the silica and tungsten oxide will spread out, wet and disperse over at least a portion of the combined external and internal surface of the porous boehmite particles.

As the composite of boehmite, silica and tungsten oxide is steamed, the boehmite converts to $\gamma\text{-Al}_2\text{O}_3$. At the same time, the silica and tungsten oxide react with the surface of the converting boehmite thereby stabilizing or freezing the surface of the converting boehmite in a transitional or boehmite-like state, while the bulk of the boehmite converts to $\gamma$-Al$_2$O$_3$. This transitional state is herein defined as a boehmite-like surface phase which has an amorphous, disordered structure which is different from both boehmite and $\gamma$-Al$_2$O$_3$. Thus, the compositions produced by the process of this invention comprise silica and tungsten oxide supported on a boehmite-like surface which, in turn, is supported on bulk alumina.

These compositions are different from similar types of compositions (a) formed by compositing particles of silica and tungsten oxide with particles of alumina and steaming the composite at high temperatures and (b) calcining the composite of silica, tungsten oxide and boehmite.

DETAILED DESCRIPTION

Those skilled in the art know that boehmite is a highly hydroxylated form of alumina that can be represented by the simple formula AlOOH. Boehmites also have relatively high surface areas. Commercially available boehmites generally have surface areas of about 300–500 M$^2$/g (BET). These materials are generally relatively porous and, consequently, their measured surface areas include both the exterior surface and the internal pore surface. When boehmite is steamed at temperatures in excess of about 500° C., it undergoes a phase change first to pseudo-boehmite and then to $\gamma$-Al$_2$O$_3$, which also results in a dramatic reduction of the surface area of from about 300–500 M$^2$/g to about 200–300 M$^2$/g. If the steaming temperature is greater than about 800° C., the formation of $\theta$-Al$_2$O$_3$ or a mixture of $\theta$-Al$_2$O$_3$ $\gamma$-Al$_2$O$_3$ occurs with a concomitant surface area reduction to from about 1–100 M$^2$/g. In marked contrast, in the process of ths invention the surface area of the final, silica and tungsten oxide-containing composition will generally range from about 180–220 M$^2$/g when the surface area of the boehmite is about 300–500 M$^2$/g. In the process and compositions of this invention, boehmite refers to the bulk structure and is meant to include pseudo-boehmite and mixtures of boehmite with pseudo-boehmite.

In the process of this invention, the silica and tungsten oxide react with the surface of the boehmite as it is undergoing phase transition, thereby "freezing" or stabilizing the changing surface in the form of boehmite-like transitional phase reacted with the silica and tungsten oxide which have an amorphous, disordered structure unlike either boehmite, psuedo-boehmite or alumina. Consequently, even though the bulk boehmite converts to alumina during the high temperature steaming treatment, the surface of the so-formed alumina or, more precisely, those portions of the surface of the so-formed alumina underlying and supporting the reacted tungsten oxide and silica, will be a boehmite-like phase stabilized by the reaction of the silica and tungsten oxide with the surface of the transforming boehmite. It is the formation of this tungsten oxide and silica-stabilized boehmite-like phase that prevents the boehmite from desurfacing down to about 100 or even M$^2$/g in the presence of high temperature steam, which will occur if the mixture of silica and tungsten oxide are not present on the boehmite surface. As will be shown in the Examples below, the compositions of this inventions are different from compositions formed (a) by high temperature steaming a composite of particles of $\gamma$-Al$_2$O$_3$, silica and tungsten oxide or (b) calcining composites of silica, tungsten oxide and boehmite.

Thus, in the process of this invention, the high temperature steaming treatment causes the tungsten oxide and silica to react with the surface of the boehmite. While not wishing to be held to any particular theory, those skilled in the art know that boehmite is a particular form of hydrated alumina which loses water of hydration at elevated temperatures. Boehmite has a relatively large amount of surface hydroxyl groups. It is believed that these surface hydroxyls on the boehmite react with the tungsten oxide and silica with the formation of oxygen-silicon bonds and oxygen-tungsten bonds. Thus, during the process of this invention, the silica and tungsten oxide react with the surface of the transforming boehmite to form a surface phase complex. This surface phase complex is non-crystalline in form and exhibits properties substantially different from either bulk silica, bulk tungsten oxide, bulk boehmite or the bulk alumina formed from high temperature steaming of the boehmite.

The amount of steam employed in forming the compositions of this invention may vary over a wide range, i.e., from less than about 1% to more than 90% of the non-reducing, steaming environment. Compositions of this invention have been made employing as little as 3% steam to as much as 90% steam. In general, the more steam that is employed the faster will be the reaction of the silica and tungsten oxide with the alumina boehmite.

In general, the loading levels of the silica and tungsten may be such that the combined amount of silica and tungsten oxide will range from about 1–50 wt. % of the total composition, with the WO$_3$ loading range from about 1–25 wt. % of the total composition and the silica loading ranging from about 1–50 wt. % of the total composition. Preferably the amount of WO$_3$ or silica will be present in an amount of from about 1 to 20 wt. % of the total composition, more preferably rom about 2–10 wt. % and most preferably from about 2–6 wt. %.

As previously stated, boehmites are generally porous materials. That is, there are a multitude of pores and channels from the exterior of a discrete, macroscopic particle to the interior of the particle. Consequently, the surface of a boehmite particle includes all the pores and channels of said boehmite and their surface area as measured by nitrogen gas adsorption according to BET theory. There is much more surface in the interior of such a discrete, macroscopic particle of boehmite than on its exterior surface. In many cases, the external surface is less than 2% of the total surface area. In this application, "surface" is used in such an art-recognized fashion and, unless expressly stated otherwise, is not to be restricted to the physical exterior surface of macroscopic particles of boehmite.

It is to be noted that the process of this invention of dispersing the silica and tungsten oxide onto the surface of boehmite by the high temperature steam treatment in a non-reducing atmosphere will not work with oxides or oxide salt precursors of, for example, titanium, zirconium, hafnium, vanadium, niobium, tantalum and chromium. That is, none of these oxides will disperse onto the surface of boehmite via the high temperature steam treatment process of this invention.

In the process of this invention, the silica source may be hydrated silica in the form of an aqueous slurry of colloidal silica or very fine particles of silicic acid which is also a form of hydrated silica. Alternatively, if convenient, the silica source may also be in the form of an insoluble silica precursor material such as silicon tetraacetate, silicon oxylate, etc. By insoluble silica precursor material is meant a silicon compound which is insoluble both in water and polar and non-polar solvents ranging from acetone, ethanol, or methanol, ketones, aldehydes, cyclic ketones, hydrocarbons, etc. The important requirement is that the precursor material be one which when subjected to the steaming treatment in the non-reducing atmosphere fairly readily converts to silica under the conditions of the steaming treatment.

In one embodiment, the tungsten oxide source may be solid particles of tungsten oxide, particles of tungstic acid which is a form of hydrated tungsten oxide or mixture thereof. In another embodiment, the tungsten oxide source may be in the form of a more conventional tungsten oxide source such as a tungsten oxide precursor salt illustrated by, for example, ammonium meta tungstate, a solution of which can be impregnated onto the boehmite, before, after or simultaneously with the silica or silica precursor in which case the high temperature steaming rapidly converts the tungsten oxide precursor to tungsten oxide. In yet another embodiment, the tungsten oxide source can be a mixture of both of the foregoing, the choice being left to the convenience of the practitioner.

The invention will be more readily understood by reference to the examples below.

EXAMPLES

EXPERIMENTAL SECTION

Introduction

The preparation of acid catalysts was investigated where the alumina support was boehmite (A100H) and where the precursor salt (or salts) can be insoluble in an aqueous phase. During the activation of the sample by treatment in steam at high temperature to produce an acidic catalyst, the boehmite phase converted to $\gamma$-$Al_2O_3$, or $\theta$-$Al_2O_3$, and the precursor salt, or salts, dispersed on the alumina surface to introduce strong acid sites. In the process of steaming these materials, high cracking activity and high surface area are introduced in the final catalyst composition. The unexpected activity and high surface area of these catalysts is a result of starting with a boehmite alumina and dispersing the active catalyst components.

EXAMPLE 1

The preparation of 6% $WO_3$ on $\gamma$-$Al_2O_3$ was carried out by ball-milling 3.24g of $H_2WO_4$ (Alfa Inorganic) with 58.75g of A100H (Davison Chemical Company) for 15 minutes. The same was steamed at 870° C. in 90% $H_2O$-10% $N_2$ for 16 hrs. in a vertical tube furnace. The catalytic cracking activity of samples of the instant invention were performed on a modified Micro Activity Test (MAT) unit described in the Experimental Section. The MAT activity of this steamed catalyst was 27 with a conversion to 400−° F. liquids of 9.2 wt. % based on feed. The BET surface area of this steamed sample was measured to be 87 m$^2$/g (measured using a Digisorb 2500 as were all the BET surface areas reported in the instant invention). This sample demonstrates that active cracking catalysts can be prepared by physical mixture of an insoluble tungsten precursor and a boehmitic alumina followed by steam treatment.

A 6% $WO_3$ and 6% $SiO_2$ on $\gamma$-$Al_2O_3$ sample was prepared for comparison to the 6% $WO_3$ on $\gamma$-$Al_2O_3$ sample of this example. For this preparation, 2.95g of ammonium meta-tungstate was added to 6.8g of "Ludox" AS-40 (a colloidal $SiO_2$, tradename DuPont) in 60 ml of $H_2O$. This solution mixture was added to 50g of A100H (Davidson Chemical Company) by the pore filling method. The sample was dried at 120° C. for 16 hrs. and then steamed at 870° C. for 16 hrs. as described previously in this example. The MAT activity of this sample was 42 with a conversion to 400−° F. liquids of 17.2 wt. % based on feed. This sample of 6% $WO_3$ and 6% $SiO_2$ on $\gamma$-$Al_2O_3$ is clearly superior to the 6% $WO_3$ on $\gamma$-$Al_2O_3$ sample described in this example. In addition, the BET surface area of this 6% $WO_3$-6% $SiO_2$ on $\gamma$-$Al_2O_3$ catalyst was measured to be 174 m$^2$/g. This sample surface area is twice that of the 6% $WO_3$ on $\gamma$-$Al_2O_3$ sample of this example. This 6% $WO_3$-6% $SiO_2$ on $\gamma$-$Al_2O_3$ sample with high surface area and high cracking activity is an ideal catalyst for heavy ends conversion processes, such as residuum cracking and residuum hydroconversion. The results of this example will be useful for comparison to other examples of the instant invention.

EXAMPLE 2

In this example, two $WO_3$ on $Al_2O_3$ catalysts were prepared using AlOOH by use of two different preparation techniques. One 12% $WO_3$ on $\gamma$-$Al_2O_3$ catalyst was prepared using $H_2WO_4$ as described in Example 1. The other sample was prepared using ammonium meta-tungstate dissolved in water using the pore filling method of catalyst preparation. This sample was dried at 110° C. for 16 hrs. Both samples were steam treated at 870° C. for 16 hrs. as described in Example 1. The MAT activity and conversion of 400−° F. liquid products of both these samples were identical: 44 and 16.4 wt. % based on feed. In addition, both samples had the same BET surface area of 86 m$^2$/g. It should be noted that the 6% $WO_3$-6% $SiO_2$ on $\gamma$-$Al_2O_3$ sample of Example 1 has a conversion of liquid products superior to the above 12 wt. % $WO_3$ on $\gamma$-$Al_2O_3$ catalysts while having only half the tungsten content. As tungsten oxide is an expensive component of the catalysts of the instant invention, the mixed $WO_3$-$SiO_2$ on $Al_2O_3$ catalyst of Example 1 shows that the tungsten concentration can be decreased dramatically while maintaining high activity and high selectivity to desired products. Further, this example demonstrates that active cracking catalysts can be prepared using an aqueous solution soluble precursor (ammonium meta-tungstate) or an insoluble precursor (tungstic acid).

EXAMPLE 3

The preparation of 7.4 wt. % $WO_3$ on $\gamma$-$Al_2O_3$ was carried out using AlOOH (Cyanamid, Reforming Grade) as described in Example 2 using $H_2WO_4$. The sample was steamed at 870° C. for 1 hr. as described in Example 1. The MAT activity of this steam catalyst was 51 with a conversion to 400−° F. liquids of 19.2 wt. % based on feed. The BET surface area of this steamed sample was measured to be 114 m$^2$/g. This sample shows superior activity and liquid yield compared to the samples of Example 1 with 6% $WO_3$ contents.

A 7.3 wt. % $WO_3$/7.3 wt. % $SiO_2$ on $\gamma$-$Al_2O_3$ sample was carried out using Cyanamid AlOOH. This sample was prepared as described in Example 1. Two portions of this sample were activated by steam treatment as described in Example 1: one for 1 hr. and the other for 16 hrs. The sample steamed for 1 hr. had a MAT activity of 52 with a conversion of 400−° F. liquids of 17.8 wt. % based on feed. The BET surface area of this sample was measured to be 188 m$^2$/g. As shown in Example 1, incorporation of silica along with tungsten oxide on Al$_2$O$_3$ of the catalysts of the instant invention leads to a higher surface area than obtained for tungsten oxide alone on Al$_2$O$_3$. The 7.3 WO$_3$-7.3% SiO$_2$ on Al$_2$O$_3$ sample steamed for 16 hrs. had a MAT activity of 46 with a conversion to 400−° F. liquids of 16.0 wt. % based on feed. The BET surface area of this sample was measured to be 182 m$^2$/g. This sample demonstrates that active and steam stable catalysts can be prepared where mixed WO$_3$-SiO$_2$ on $\gamma$-Al$_2$O$_3$ catalysts are prepared using AlOOH as the alumina precursor support.

EXAMPLE 4

In this example a 12 wt. % SiO$_2$ on Al$_2$O$_3$ sample will be compared to a 7 wt. % WO$_3$-12 wt. % SiO$_2$ sample. The 12 wt. % SiO$_2$ sample was prepared using "Ludox" AS-40 as described in Example 1. To 27g of AlOOH (Cyanamid, Reforming Grade) was added 7.5g of Ludox in 18 ml total solution volume. This sample was steamed at 870° C. for 1 hr. as described in Example 1. The MAT activity of this steamed catalyst was 28 with a conversion to 400−° F. liquids of 9.5 wt. % based on feed. The 7 wt. % WO$_3$-12 wt. % SiO$_2$ sample was prepared as described in Example 1 using ammonium meta-tungstate and "Ludox" AS-40. To 42g of AlOOH (Cyanamid, reforming grade) was added 3.24g of ammonium metatungstate and 12.g of "Ludox" in 28 ml total solution volume. This sample was steamed at 870° C. for 1 hr. as described in Example 1. The MAT activity of this steamed catalyst was 50 with a conversion to 400−° F. liquids of 18.2 wt. % based on feed. This example demonstrates the superior catalytic activity and selectivity of WO$_3$-SiO$_2$ on Al$_2$O$_3$. The BET surface area of these two samples were quite similar: 201 and 214 for 7% WO$_3$-12% SiO$_2$ on Al$_2$O$_3$ and 12% SiO$_2$ on Al$_2$O$_3$, respectively. Although this 12% SiO$_2$ sample retained higher surface area than the 7.4 wt. % WO$_3$ on Al$_2$O$_3$ of Example 3, the catalytic performance was inferior to the 7% WO$_3$ content samples of Example 3.

EXAMPLE 5

A sample of 6 wt % WO$_3$ and 6 wt. % SiO$_2$ on $\gamma$-Al$_2$O$_3$ was prepared using $\gamma$-Al$_2$O$_3$ for comparison to the catalysts prepared on AlOOH of the instant invention. To 44g of $\gamma$-Al$_2$O$_3$ (Engelhard Industries, reforming grade) was added 7.5g of "Ludox" AS-40 and 3.24g of ammonium meta-tungstate in 26 ml of H$_2$O. This solution mixture was added to the alumina by the pore filling method. The sample was dried at 120° C. for 16 hrs. and then steamed at 870° C. for 16 hrs. as described in Example 1. The MAT activity of this sample was 45 with a conversion to 400−° F. liquids of 15.4 wt. % based on feed. The conversion to liquid products of this sample is inferior to the 6% WO$_3$-6% SiO$_2$ $\gamma$-Al$_2$O$_3$ of Example 1.

The BET surface area of the 6% WO$_3$-6% SiO$_2$ on $\gamma$-Al$_2$O$_3$ sample of this example was measured to be 131 m$^2$/g. Therefore, the 6% WO$_3$-6% SiO$_2$ on $\gamma$-Al$_2$O$_3$ sample of Example 1, made using AlOOH as the alumina precursor, has a 58% higher surface area than the 6% WO$_3$-6% SiO$_2$ on $\gamma$-Al$_2$O$_3$ sample prepared using $\gamma$-Al$_2$O$_3$. The superior selectivity to liquid products and the higher surface area for catalysts prepared employing AlOOH rather than using $\gamma$-Al$_2$O$_3$ is demonstrated by this example. Catalysts of the instant invention should be particularly suited for application in heavy end conversion processes, such as residuum cracking and residuum hydroconversion.

What is claimed is:

1. A process for hydrocracking a feed comprising a hydrocarbon which comprises contacting said feed and hydrogen at elevated temperature with a hydrocracking catalyst for a time sufficient to hydrocrack at least a portion of said feed wherein said catalyst is prepared by (i) forming a composite of a mixture of (a) particles of tungsten oxide or one of more suitable tungsten oxide precursors, (b) particles of silica or silica precursor and (c) particles of porous boehmite, and (ii) steaming said composite at an elevated temperature of at least about 500° C. in a non-reducing environment and the presence of steam for a time sufficient for at least a portion of the tungsten oxide and silica to react with the boehmite surface and for at least a portion of the boehmite to convert to gamma alumina.

2. The process of claim 1 wherein at least a portion of the tungsten oxide has dispersed over the boehmite surface.

3. The process of claim 2 wherein at least a portion of the silica has dipersed over the boehmite surface.

4. The process of claim 3 wherein the combined amount of silica and tungsten oxide ranges from between about 1–50 wt. % of the total catalyst composition.

5. The process of claim 4 wherein the elevated temperature employed in forming said catalyst composition is at least about 700° C.

6. The process of claim 1 wherein the amount of steam employed in forming the catalyst composition ranges between from about 1–90% of the non-reducing environment.

7. A process for cracking a feed comprising a hydrocarbon which comprises contacting said feed at elevated temperature with a catalyst prepared by (i) forming a composite of tungsten oxide or one or more suitable tungsten oxide precursors, (b) particles of silica or silica precursor and (c) particles of porous boehmite, and (ii) steaming said composite at an elevated temperature of at least about 500° C. in a non-reducing environment and the the presence of steam for a time sufficient for at least a portion of the tungsten oxide and silica to react with the boehmite surface and for at least a portion of the boehmite to convert to gamma alumina.

8. The process of claim 7 wherein at least a portion of the tungsten oxide has dispersed over the boehmite surface.

9. The process of claim 8 wherein at least a portion of the silica has dispersed over the boehmite surface.

10. The process of claim 9 wherein the combined amount of silica and tungsten oxide ranges from between about 1–50 wt. % of the total catalyst composition.

11. The process of claim 10 wherein the elevated temperature employed in forming said catalyst is at least about 700° C.

12. The process of claim 11 wherein the amount of steam employed in forming the catalyst ranges between from about 1–90% of the non-reducing environment.

* * * * *